Figure 9:
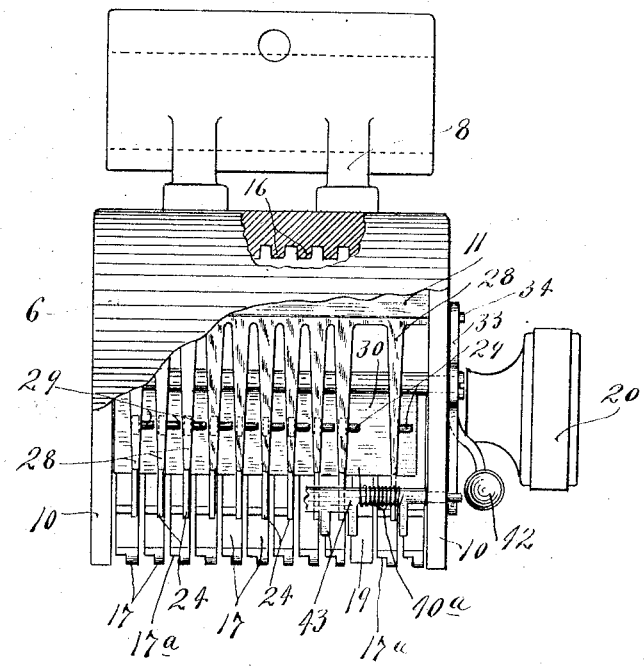

No. 873,314. PATENTED DEC. 10, 1907.
O. C. KAVLE.
COMPUTING ATTACHMENT FOR TYPE WRITING MACHINES.
APPLICATION FILED NOV. 15, 1905.
6 SHEETS—SHEET 1.
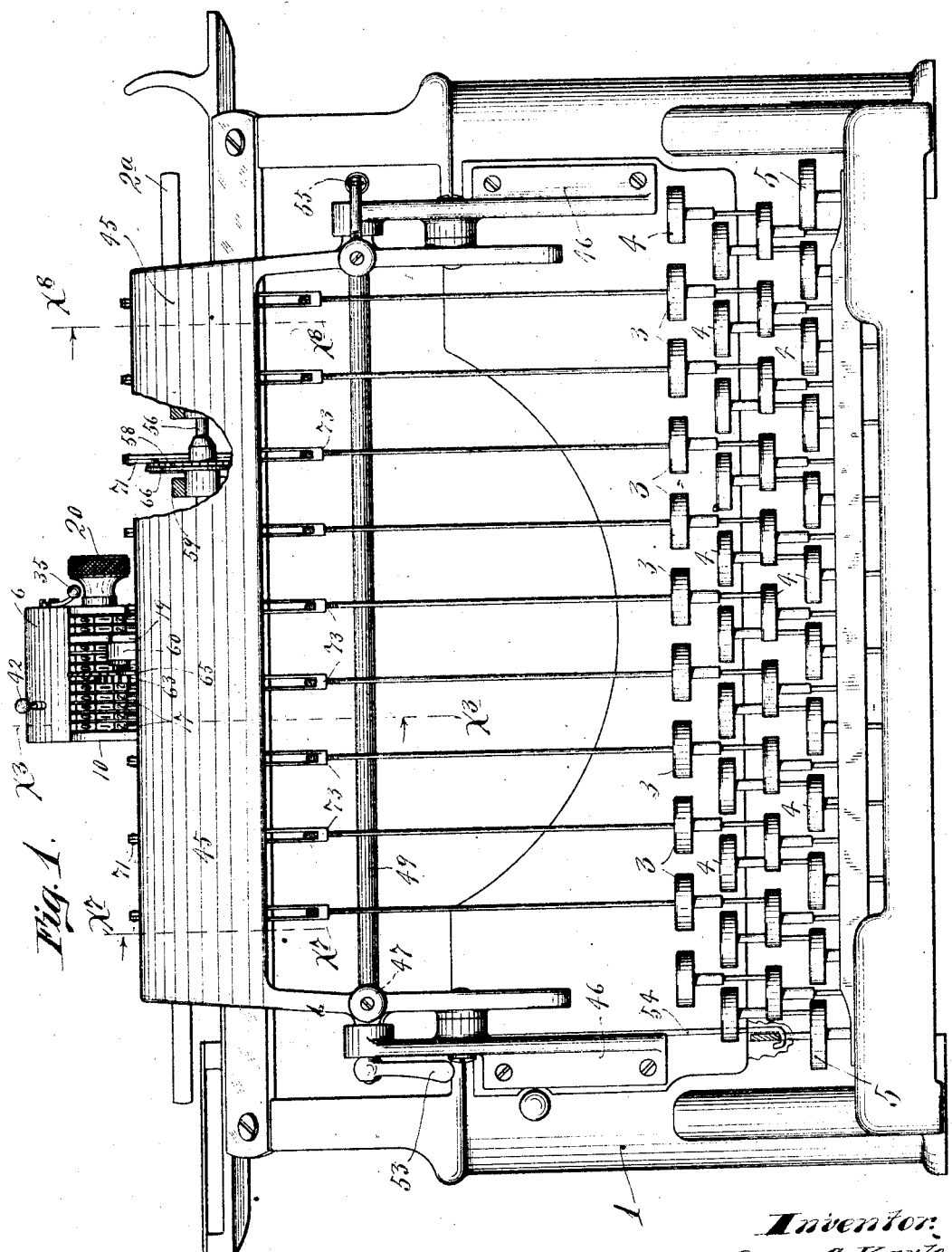
Witnesses.
E. W. Jeppesen.
R. C. Mabry.
Inventor:
Oscar C. Kavle.
By his Attorneys.
Williamson Much 2nd

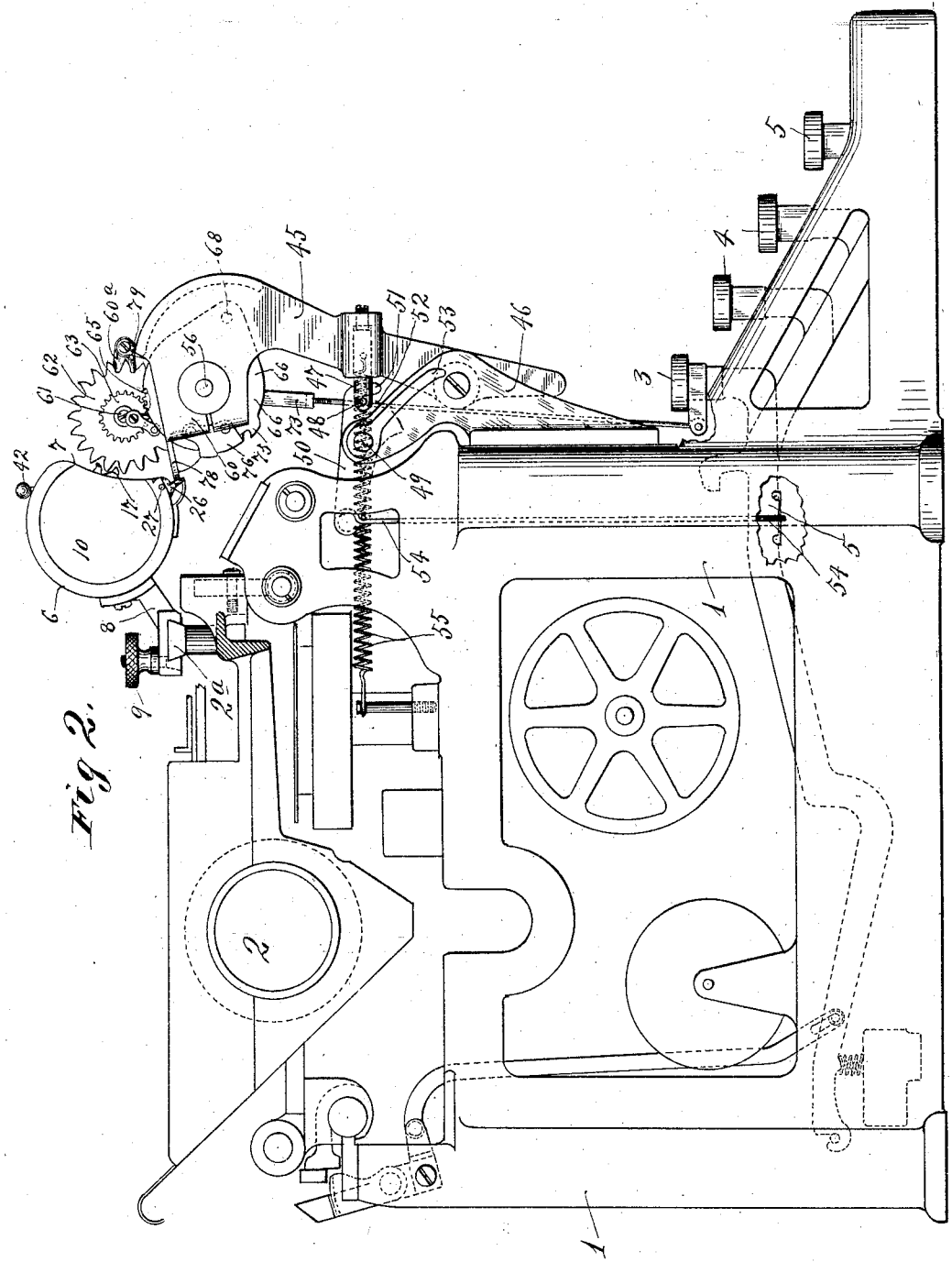

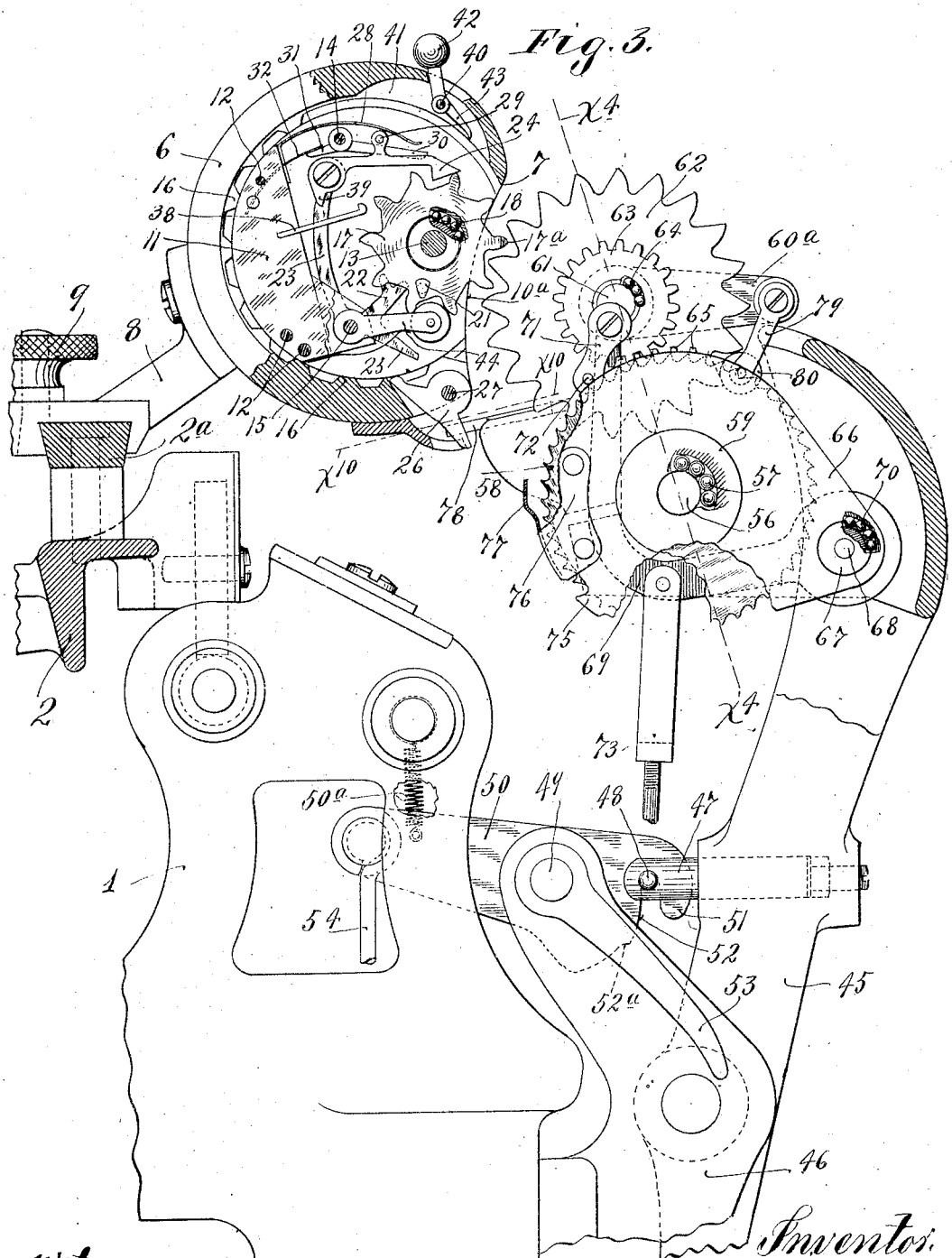

No. 873,314. PATENTED DEC. 10, 1907.
O. C. KAVLE.
COMPUTING ATTACHMENT FOR TYPE WRITING MACHINES.
APPLICATION FILED NOV. 15, 1905.
6 SHEETS—SHEET 4.
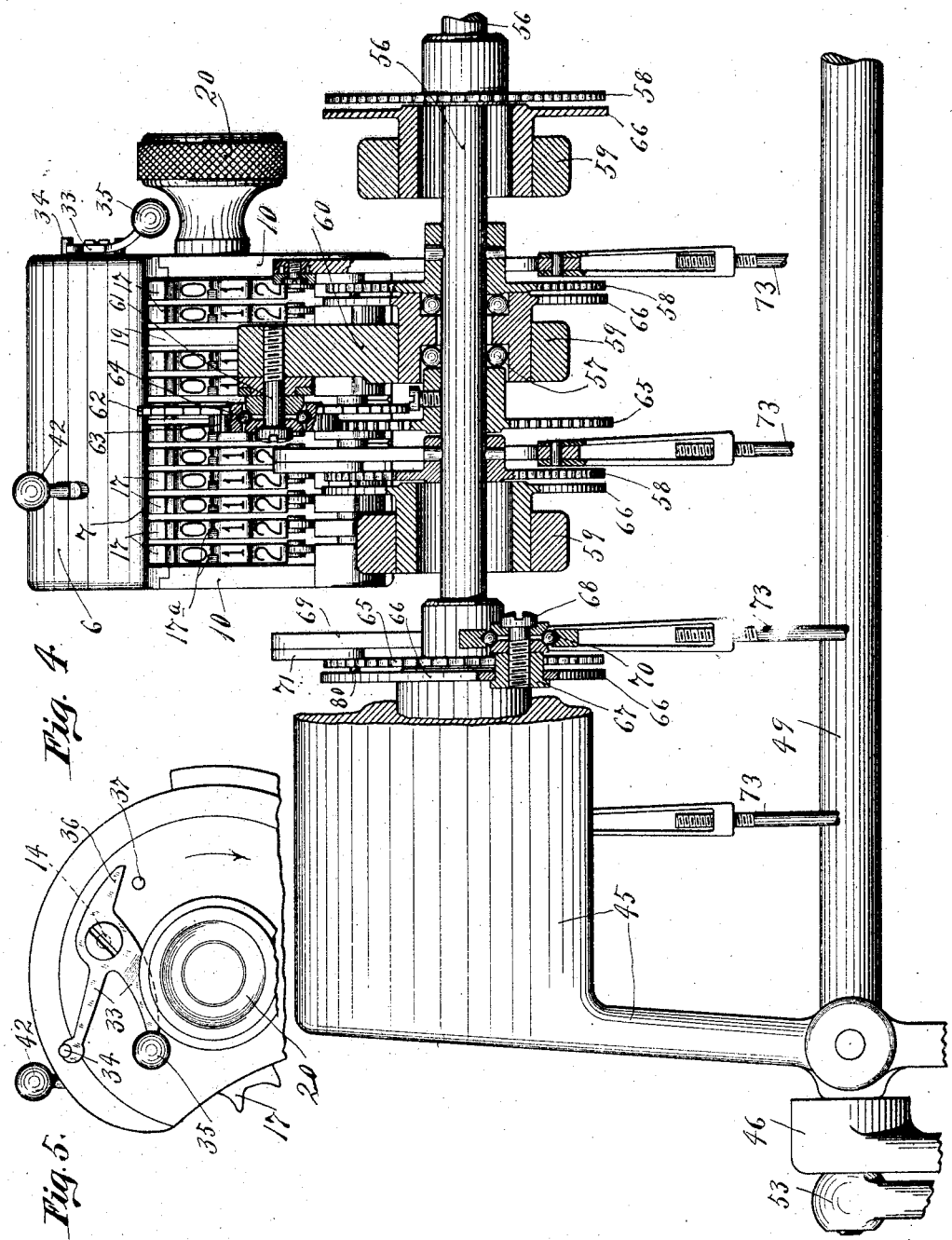
Witnesses.
E. W. Jeppesen.
R. C. Mabry.
Inventor:
Oscar C. Kavle.
By his Attorneys.
Williamson Merchant

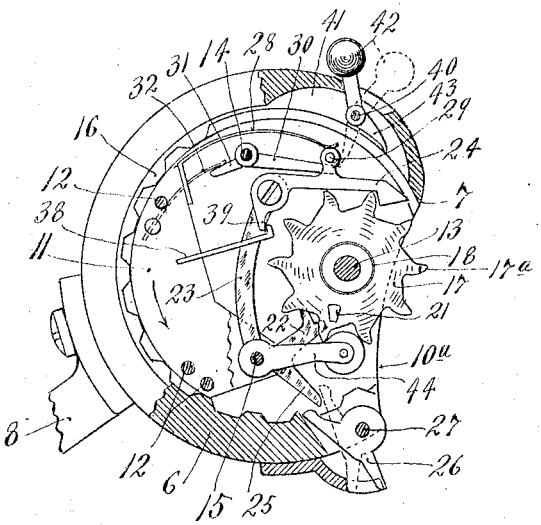
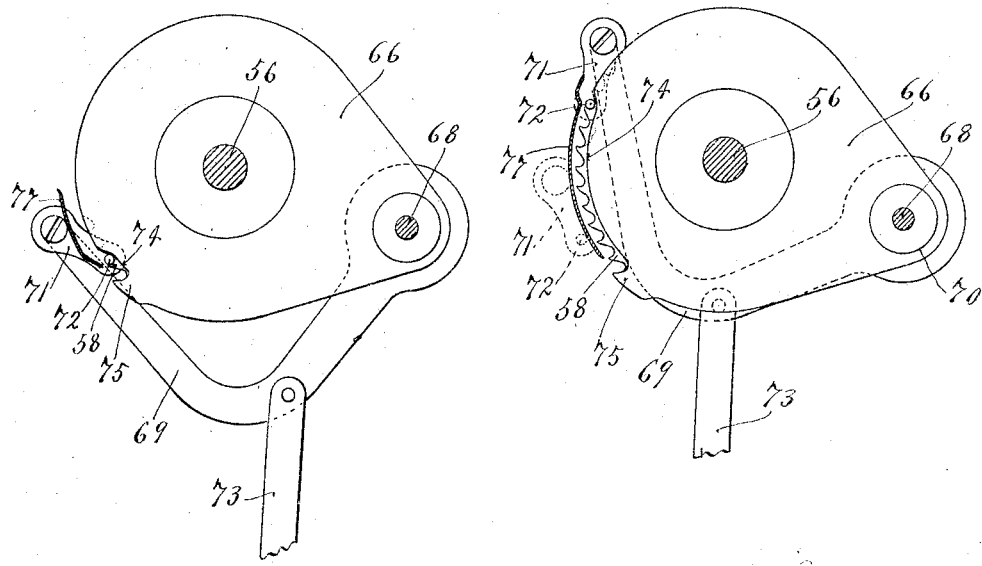

No. 873,314.                                          PATENTED DEC. 10, 1907.
O. C. KAVLE.
COMPUTING ATTACHMENT FOR TYPE WRITING MACHINES.
APPLICATION FILED NOV. 15, 1905.

6 SHEETS—SHEET 6.

Witnesses
A. H. Opsahl.
R. C. Mabey.

Inventor
Oscar C. Kavle.
By his Attorneys.
Williamson Merchant

UNITED STATES PATENT OFFICE.

OSCAR C. KAVLE, OF SYRACUSE, NEW YORK, ASSIGNOR TO JOHN T. UNDERWOOD, OF NEW YORK, N. Y.

COMPUTING ATTACHMENT FOR TYPE-WRITING MACHINES.

No. 873,314.      Specification of Letters Patent.      Patented Dec. 10, 1907.

Application filed November 15, 1905. Serial No. 287,425.

*To all whom it may concern:*

Be it known that I, OSCAR C. KAVLE, a citizen of the United States, residing at Syracuse, in the county of Onondaga and State of New York, have invented certain new and useful Improvements in Computing Attachments for Type-Writing Machines; and I do hereby declare the following to be a full, clear, and exact description of the invention, such as will enable others skilled in the art to which it appertains to make and use the same.

My invention relates to combined typewriting and computing machines, and is in the nature of an improvement on that type of combined machine disclosed and claimed in two U. S. Letters Patent issued to J. H. Neal, for computing attachments for typewriting machines, the one of date January 29th, 1901, under Number 666,684, and the other of date December 31st, 1901, under Number 689,983. In the said Neal patents, a register or "totalizer", made up of a plurality of wheels and carrying devices, is mounted on and movable with the paper carriage of the typewriter; and for action on the wheels of the register or totalizer, in succession, from the left toward the right, as the typewriter carriage is moved from the right toward the left, a key-controlled differentially movable "master-wheel" is employed. The master-wheel, in the said prior patents, is mounted to rotate on a fixed support, and is operated by the numeral keys of the typewriter, through intermediate driving devices, each of which has a driving action corresponding to the numeral or value represented by the particular key and its connected type-bar.

My invention involves various features of improvement over the Neal machine, all of which will be hereinafter described and particularly defined in the claims; and among which may be here particularly enumerated, improvements in means for moving the master-wheel to and from a position in which it is operative on the wheels of the register; in the differential or variable throw devices for imparting differential movements to the master-wheel, and hence to the wheels of the register; and in the means for resetting the wheels of the register to zero position.

Generally stated, the invention consists in the novel devices and combinations of devices hereinafter described and defined in the claims.

In the accompanying drawings, which illustrate my invention, like characters indicate like parts throughout the several views.

Figure 10:
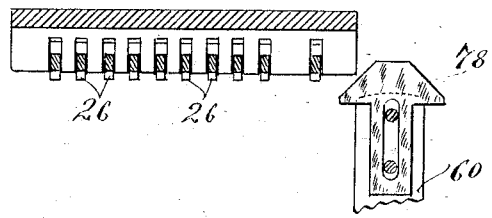

Figure 1 is a view in front elevation, with some parts broken away, showing a typewriting machine with my improved attachment applied thereto. Fig. 2 is a side elevation of the parts shown in Fig. 1, some parts being sectioned and some parts being indicated in diagram only. Fig. 3 is an enlarged section, taken approximately on the line $x^3$ $x^3$ of Fig. 1, some parts being broken away. Fig. 4 is a view, partly in front elevation and partly in section on the line $x^4$ $x^4$ of Fig. 3, some parts being broken away. Fig. 5 is a detail in right side elevation, some parts being broken away, of the register removed from working position. Fig. 6 is a sectional view of the register taken approximately on the same line as Fig. 3, but illustrating different positions of the internal mechanism of the register. Fig. 7 is a detail in section on the line $x^7$ $x^7$ of Fig. 1. Fig. 8 is a detail in section on the line $x^8$ $x^8$ of Fig. 1, some parts being removed. Fig. 9 is a plan view of the register removed from working position, and with some parts broken away; and Fig. 10 is a section taken on the line $x^{10}$ $x^{10}$ of Fig. 3.

The typewriter illustrated in the drawings is what is known to the trade as the "Underwood No. 5"; and of the parts of the typewriter, it is, for the purposes of this case, desirable to specifically note only the frame 1, the transversely movable paper-carriage 2, the numeral keys 3, the character keys exclusive of the numeral keys indicated by the numeral 4, and the shift keys 5; which keys 3 and 4 have the usual type-bar connections for printing, and which shift keys 5 have the usual connections with the paper carriage for moving the same so as to shift from "lower case" to "upper case" characters.

*Register.*—The body of the register case is in the form of a cylinder 6, which is cut away at 7 from end to end. This case 6 is positioned with its axis extended parallel to th line of feed movement of the paper carriage 2, and with its cutaway portion 7 exposed at the front of the machine; and in this position said case is supported by a bracket 8 that is applied to a transverse bar 2ª of the said paper carriage 2. The register case 6 is thus rigidly supported by and connected for movements with the paper carriage 2, but is preferably connected for adjustments transversely of the machine, or in the direction of the carriage's feed movement, such adjustment, as shown, being accomplished by a dovetailed engagement between the bracket 8 and the bar 2ª, and by a nut-equipped wedge bolt 9.

Mounted to rotate within the cylindrical case 6, is a support made up of a pair of heads 10 and a segmental spacing block 11, which parts are rigidly united by screws 12. The heads 10 have grooved engagement with and are mounted to rotate in the end portions of the cylindrical case 6, and they are cut at 10ª, so that when they stand in normal positions, they aline with the notch 7 of the said case 6. Extending parallel to the axis of the case 6, but eccentric thereto, with their ends seated in the heads 10, are three shafts 13, 14 and 15, the first of which is free to rotate, and the other two of which are fixed to said heads. The case section 6 is further formed or provided with internal segmental racks 16 that are spaced apart laterally, as best shown in Fig. 9.

Loosely journaled on the shaft 13 is a plurality of wheels 17 that are provided each with ten teeth and are marked between the teeth with the digits "0" to "9" inclusive. The wheels 17 are, as shown in Fig. 3, mounted on ball-bearing devices 18. There may be any desired number of these wheels, but the adjacent wheels must be spaced apart distances equal to the letter space movement of the typewriter paper carriage. The two wheels 17 at the extreme right may be arranged to register the decimal fractions of one hundred, as, for instance, pennies and dimes; and with this arrangement there should be a full space between the second and third register wheels from the right, so that the register will not be actuated when a period is printed or a space is left between the dollars and cents, in printing the record on the paper. As shown in Figs. 1 and 4, a spacing washer or blank wheel 19 is placed between the said second and third wheels 17.

The register wheels 17 are so eccentrically located with respect to the cylindrical case 6 that the outer portions of their teeth will engage with the teeth of the respective internal segmental gears 16 of the case 6 when the rotary support, made up of the heads 10 and block 11, is rotated bodily. Each register wheel 17 has one tooth, to-wit, the tooth which is located between its "0" and its "1" marks, reduced in width at its outer portion, by a notch 17ª. By reference to Fig. 9 it will be seen that the respective internal segmental gears 16 stand in line with the notches 17ª of the wheels 17, so that they will not act upon the said wheels when the reduced teeth are turned into the arc of the said internal gears. Hence it of course follows, that no matter where, or in what positions, the said wheels 17 may stand when the rotation of the support 10—11 is begun, they will all be left standing in "0" positions after the rotation of said support has been completed. The said support should be rotated in the direction of the arrow marked thereon in Figs. 5 and 6, and in order that this movement may be easily accomplished, one of the heads 10 is provided with a knurled knob or hand piece 20.

On each register wheel 17, except the one of highest decimal order, is a laterally projecting carrying lug 21. The carrying lugs 21 operate upon arms 22 of carrying levers 23, which carrying levers are pivoted on the transverse shaft 15 of the rotary support. The carrying levers 23 are provided, at their free ends, with long pawls 24. The pawls 24 of the several carrying levers operate upon the teeth of the register wheels 17 that are of next higher order than the wheel which operates the said carrying lever. Also each carrying lever 23 has a depending arm 25, which is adapted to be acted upon by a rocker 26, which rockers are arranged in a series and are pivoted side by side on a rod 27 secured to the lower forward portion of the non-rotary case 6.

The pawls 24 are yieldingly pressed downward by light spring-fingers 28 secured to the connecting block 11 of the rotary support. The said pawls are provided with small laterally projecting pins 29 that rest upon lifting fingers 30 that are rigidly secured to the shaft 14. The shaft 14 is provided with a rearwardly projecting finger 31 that is yieldingly pressed downward by a spring 32 attached at one end of the block 11. The spring 32 is strong enough to overcome all of the relatively light springs 28. Rigidly secured to the outwardly projecting right hand end of the shaft 14 is a latch arm 33, the notched free end of which engages with the stud 34 on the non-rotary case 6, to normally lock the rotary support in the position shown in Fig. 3, and to hold the lifting fingers 30 pressed down so that the pawls 24 may operate upon the teeth of the respective wheels 17. The latch arm 33 is provided with a finger piece 35, and is also provided with a stop lug 36 that engages with a stud 37 on the right hand head 10, to limit the outward movement of said arm 33 when released. The numeral 38 indicates stop fingers which are secured to the block 11, and engage with lugs 39 on the pawls 24, to hold the free ends of the latter downward when they are forced forward, as shown in Fig. 6. The numeral 40 indicates a small shaft that is mounted in the upper portion of the case 6, and works in a recess 41 thereof. This shaft 40 is provided with a finger piece 42 that works outward through a slot in the case 6. Said shaft 40 is also provided with a plurality of fingers 43 that are adapted to engage the studs 29 of the pawls 24 when the latter are moved forward, as shown in Fig. 6. A light coiled spring 40ª, attached at one end to the shaft 40, and at its other end to the case 6, tends to hold the fingers 43 and finger piece 42 in their inoperative positions, shown in full lines in Figs. 3 and 6. The register wheels are held against accidental movements by a roller-equipped spring-pressed retaining pawl 44 pivoted to the spacing block 11.

*Register actuating mechanism.*—The support for the master-wheel, and the variable stroke devices therefor, is in the form of a yoke or bail 45, the legs of which are turned downward and pivoted to laterally spaced brackets 46 rigidly secured to the typewriter frame 1. Studs 47 having transverse pins 48, project inward from the legs of the oscillatory bail-like support 45. A rock shaft 49 is mounted in the upper portions of the bearing brackets 46, and extends transversely of the machine. This rock shaft 49 is provided with arms 50 that project both rearward and forward, and at their forward ends, are provided with lock hooks 51 and with eccentrically struck cam surfaces 52, that are formed with shoulders 52ª. The hooks 51 engage the pins 48, to lock the oscillatory support 45 in its most forward position, and the cam surfaces 52 operate on said pins to move said support 45 forward, when the rear ends of said arms 50 are moved downward. This latter action is important, as will appear later on. At its left hand end, the rock shaft 49 is provided with a lever 53, by means of which it may be oscillated at will. The rear ends of the arms 50 are connected by rods 54 to the lever portions of the shift keys 5, so that when one of the shift keys is depressed, the said oscillatory support 45 will be moved forward. The oscillatory support 45 is yieldingly drawn rearward, by a coiled spring 55 attached thereto and to the frame 1 of the machine.

A shaft 56 is loosely journaled, by means of ball-bearings 57, in flanges at the upper side portions of the oscillatory support 45. Rigidly secured to the shaft 56, and spaced a part laterally thereon, is a series of nine ratchet wheels 58. On the upper transverse portion of the oscillatory support 45 is a laterally spaced series of rearwardly projecting bearing lugs 59 that have large passages, through which the shaft 56 extends. One of the intermediate lugs 59 is provided with an upward extension 60 having a stud 61 upon which is loosely mounted a peripherally toothed master-wheel 62 which, as shown, is cast integral with a spur pinion 63. The said master-wheel and pinion are mounted on said stud 61, by means of a ball-bearing device 64. Rigidly secured to the shaft 56 is a spur gear 65 that meshes with the pinion 63.

Adjacent to each ratchet wheel 58 is a non-rotary pawl-guiding cam plate 66 which, as shown, has a large hub that surrounds the shaft 56 and fits rigidly in a seat in the corresponding bearing lug 59. The forwardly projecting portion of these cam plates 66 have thimble-like hubs 67 that are brazed or otherwise rigidly secured thereto, and to which screws 68 are applied. For coöperation with each ratchet wheel, there is a crooked driving lever 69 that is mounted on a corresponding bearing screw 68, by means of a ball-bearing 70. To the upturned free end of each driving lever 69 is pivoted a driving pawl 71, provided with a laterally projecting stud 72 that overlies the corresponding ratchet wheel and coöperating cam plate 66. The driving levers 69 are connected, by links 73, to the respective numeral keys 3 that are marked with the numerals 1 to 9 inclusive, and which are connected to the type bars which print such numerals.

At their rear edges, the cam plates 66 are formed with segmental depressions 74, that terminate at their lower extremes in stop lugs 75. These segmental notches 74 extend on the line of a circle struck from the axis of the shaft 57, and having a less diameter than a circle intersecting the bottoms of the teeth of the ratchet wheels 65. For considerable distances above the segmental notches 74, the cam plates 66 extend concentric to the axis of the shaft 57 on the line of a circle including the points of the teeth of the ratchet wheels. The driving pawl 71 is preferably spring-pressed into engagement with the cam plate 66. The notch in the cam plate at the extreme left which coöperates with a pawl-equipped lever that is connected to the numeral key marked with the numeral 1, (see Fig. 7), is in length only sufficient to permit the pawl to move the coöperating ratchet wheel one unit of distance, or the distance between the adjacent teeth of said ratchet wheel. The slot in the cam plate 66 that coöperates with the pawl-equipped driving lever that is connected to the numeral key marked with the numeral 9 (see Fig. 8), is of such length that it will permit the driving pawl 71 to move the coöperating ratchet wheel nine units, or, in other words, the distance represented by nine teeth of said wheel. In brief, the notch 74 of each cam plate 66 corresponds in length to the number of units of movement that must be imparted to the master-wheel 62, when the corresponding key 3 is struck.

Rigidly secured to each cam plate 66 is a supplemental plate or clip 76, which is provided with a laterally projecting detaining flange or cam 77. The upper extremities of these detaining flanges 77 flare away from the teeth of the coöperating ratchet wheel, but the main body portions thereof extend so close to the points of the ratchet teeth that they will positively hold the studs 72 of the coöperating pawls in engagement with the said ratchet teeth, and thus prevent return movements of the said pawls, from intermediate positions. Otherwise stated, the said detaining flanges operate as full-stroke devices, to insure full strokes of the said driving pawls. A driving pawl completes its full downward or operating stroke when its stud 72 is moved into engagement with the stop lug 75 of the corresponding cam plate 66, at which time said stud is carried below the said detaining flange. It is here important to note that when the ratchet wheel has been given its full movement, its tooth which stands just above the stud 72 of said pawl, stands in a position to direct the said stud to the outer surface of said detaining flange. Hence, under an upward movement of said driving lever and its pawl, the said stud 72 will run over the outer surface of said detaining flange, and will be thereby held out of engagement with the teeth of said ratchet wheel.

By reference particularly to Figs. 7 and 8 it will be noted that the body portions of the detaining flanges 77 vary in length according to the lengths of the notches 74 of the coöperating cam plates. In one sense, these cam plates and detaining flanges coöperate to form channels that insure full strokes of the respective driving pawls and move the said pawls to and from engagement with the teeth of the coöperating ratchet wheels at the proper time.

To move the so-called rockers 26 and cause the same to actuate the set carrying levers 23, under a return movement of the typewriter paper carriage 2 from the left toward the right, a fixed carrier actuating cam 78 is, as shown, rigidly secured to a rearwardly extended portion of the lug extension 60 of the oscillatory support 45. When the oscillatory support 45 is in the position shown in Figs. 2 and 3, the cam 78 stands in the path of movement of the lower ends of the rockers 26, and the teeth of the master-wheel 62 stand in position for engagement with the teeth of the particular register wheel 17 that happens to be alined in the same vertical plane therewith. It may be here stated that the teeth of the master-wheel act upon the notched teeth 17ª of the register wheels just as they do upon the other teeth thereof, or, in other words, just as if the said teeth were not notched. The master-wheel 62 is held against accidental movements by a spring-pressed retaining pawl 79, pivoted to a forward projection 60ª of the bearing lug 60, and provided at its free end with a roller 80 that directly engages the teeth of said master-wheel.

*Operation.*—The operation, briefly described, is as follows: The position in which the registers set on the bar 2ª of the paper carriage 2 will determine the transverse position which the printed record will occupy on the paper or record sheet; and, as is evident, one or more columns of such figures may be printed on the same sheet of paper, by transverse adjustments of said register, after the completion of any one column. The different amounts to be added are struck on the numeral keys 3, in the same manner as if only the printed record thereof on paper were required; but, of course, when the amount is to be recorded on the register, the oscillatory frame 45 and the master-wheel 62 must be set in positions shown in Figs. 2 and 3, and the paper carriage 2 must be brought to such a position as will bring the proper register wheel 17 into a position to be acted upon by the initial movement of the master wheel 62. The numeral keys representing the successive numerals of the amount to be added being then struck in the proper order of succession, and as they are naturally read, from the left toward the right, will then be printed on the record paper and accumulated on the proper wheels of the register. Whenever one of the register wheels 17 is moved from its "9" position to its "0" position, its lug 21 will engage the arm 22 of the coöperating carrying lever 23 and thereby move said lever into the position shown in Fig. 6, and thereby cause the pawl 24 to reach forward and engage a forward tooth of the register wheel of next higher order. This movement of the said carrying lever and its pawl does not in itself nor at this time effect the carrying from a wheel of lower order to a wheel of higher order.

The above actions take place under a movement of the paper carriage 2 from the right toward the left and under a successive action of the master wheel 62 on the register wheels, from the left toward the right. As has already been clearly described, the number of units of rotary movement which will under any one key action be imparted to the master wheel and the particular register wheel which is then in position to be acted upon by said master wheel depends upon which of the numeral keys is struck or depressed, and is accomplished through the variable stroke devices made up of the pawl equipped levers 69, ratchet wheels 58, and coöperating parts.

The carrying for the register wheels of lower order to the register wheels of higher order takes place when the paper carriage 2 and the register carried thereby are given their return movement from the left toward the right, under which movement the fixed carrying cam 78 is caused to act successively on the rockers 26, in an order from the right toward the left. When the lower arm of a rocker 26 is moved rearward, by the carrying cam 78, its upper arm engages the arm 25 of the corresponding carrying lever 23, if the latter happens to be in its "set" position shown in Fig. 6, and returns the said lever to its normal position shown in Fig. 3, thereby causing the pawl 24 of said lever to impart one step of rotary movement to the register wheel 17 of next higher order. Any carrying lever which stands in its normal position will not be acted upon by a movement of its coöperating rocker 26. It is, however, evident that if under the carrying action above described one of the register wheels 17 happens to be moved from its "9" position to its "0" position, its lug 21, acting upon the arm 22 of the coöperating carrying lever, will move the said lever into its "set" position shown in Fig. 6 and that the movement will take place at a time in advance of the action of the carrying cam 78 on the rocker 26 which acts upon the said carrying lever, through its rocker 26. Hence the carrying from the register wheels of lower to those of higher order is properly accomplished under all conditions or circumstances.

The manner in which the register wheels are restored to zero positions, by a bodily rotation of the support 10—11 and parts mounted thereon, in the direction of the arrow marked in Fig. 6, has, in a general way, already been described. Before the register wheels can be restored to zero positions by a rotary movement of the internal mechanism of the register as above described, it is necessary that the carrying levers first be restored to their normal positions, and this, of course, is accomplished when the paper carriage has first been given its return movement from the left toward the right. It is, however, some times desirable to reset the register wheels to their zero positions before the paper carriage is given its return movement from the left toward the right. To accomplish this result, the releasing lever 42 is moved forward into its extreme position beyond the position shown by dotted lines in Fig. 6, and under this movement, the restoring fingers 43, acting on the studs 29 of the pawls 24 of the set carrying levers, first lift the said pawls out of engagement with the teeth of the respective register wheels, and then force the said carrying levers and their pawls back into normal position.

When a column of figures have been printed on the record sheet and accumulated on the wheels of the register, the sum will be shown by the exposed figures of the several register wheels, and the figures representing this sum may be then printed at the foot of the column, without action on the register, by first pressing upward on the arm 53 of the rock shaft 49, thereby causing the cam surfaces 52 of the levers 50 to act upon the pins 48 and rock the support 45 forward so as to carry the master-wheel 62 into an inoperative position, that is, into a position in which it may rotate without action on any register wheel. When the levers 50 have been moved so as to engage the shoulders 52$^a$ of the said pins 48, they will be temporarily held in that position and the said support 45 and master-wheel 62 will be held in their forward positions. When the support 45 is moved slightly forward, the spring 50$^a$ will restore the levers 50 to their normal positions. By reference to Fig. 1 it will be seen that the lower end of the rod 54 is loosely hooked under the lever of the shift key 5, so that a downward movement of said rod will not depress the said shift key.

The key action is rendered extremely light by the ball-bearings upon which the master-wheel, the register wheels, and pawl-equipped driving levers and ratchet wheel shaft are mounted, and this, in a machine wherein the wheels of the register are set by a force exerted by the finger movement, is, of course, of the greatest importance.

What I claim and desire to secure by Letters Patent of the United States is, as follows:—

1. The combination with a typewriter having a movable paper carriage, of a register mounted on and movable with said carriage, a support mounted on the typewriter frame in front of said register for movements transversely of the line of the carriage's feed movement, a master wheel mounted on said support and movable thereby into and out of position for action on the wheels of said register, and differential key connections for imparting different feed movements to said master wheel, according to the value of the depressed key, substantially as described.

2. The combination with a typewriter having a movable paper carriage, of a register mounted on said carriage, and movable therewith, an oscillatory support pivoted to the typewriter frame, for movements transversely of the line of the carriage's feed movement, a master-wheel mounted on said oscillatory support, and movable thereby into and out of position for action on the wheels of said register, and differential key connections for imparting different feed movements to said master-wheel, according to the value of the depressed key, substantially as described.

3. The combination with a typewriter having a movable carriage, of a register mounted on and movable with said carriage, an oscillatory support pivoted to the typewriter frame, for movements transversely of the line of the carriage's feed movement, a register actuator mounted on said oscillatory support and movable thereby into and out of position for action on the wheels of said register, and differential key-actuated pawl-and-ratchet devices, mounted on said oscillatory frame, and independently operative on said register actuator, to impart differential movements thereto according to the value of the depressed key, substantially as described.

4. The combination with a typewriter having a movable paper carriage, of a register mounted on said carriage and movable therewith, an oscillatory support movable transversely of the line of the carriage's feed movement, a master wheel mounted on said oscillatory support and movable thereby into and out of position for action on the wheels of said register, a shaft mounted on said oscillatory support and geared to said master wheel, a plurality of ratchet wheels carried by said shaft, key actuated levers pivoted to said oscillatory support and provided with pawls coöperating with the respective ratchet wheels, and means for determining the effective stroke of the several pawl equipped levers, according to the value of the depressed key, substantially as described.

5. The combination with a typewriter having a movable paper carriage and having a shift key connection to said carriage, of a register mounted on and movable with said paper carriage, a key controlled master wheel having a differential action on the wheels of said register, and a connection whereby when said shift key is depressed, said master wheel will be moved into a position in which it may rotate without action on any of the wheels of said register, substantially as described.

6. The combination with a typewriter having a movable paper carriage, of a register mounted on said carriage and movable therewith, an oscillatory support pivoted to the typewriter frame, for movements transversely of the line of the carriage's feed movement, a key controlled master wheel mounted on said oscillatory support and movable thereby into and out of position for action on the wheels of said register, and a latch operative to hold said oscillatory support in either of its two positions, substantially as described.

7. The combination with a typewriter having a movable paper carriage, of a register mounted on said carriage and movable therewith, a bail-like oscillatory support pivoted to the typewriter frame, for movements transversely of the line of the carriage's feed movement, a key controlled master wheel mounted on said support and movable thereby into and out of position for action on the wheels of said register, and a rock shaft having latch hooks engageable with projections on the legs of said bail-like support, to lock the latter in position to hold said master wheel positioned for action on the wheels of said register, substantially as described.

8. The combination with a typewriter having a movable paper carriage and having a shift key connection to said carriage, of a register mounted on and movable with said carriage, an oscillatory support pivoted to the typewriter frame and movable transversely of the line of the carriage's feed movement, a key controlled master wheel mounted on said oscillatory support and movable thereby into and out of position for action on the wheels of said register, and a connection between said oscillatory support and said shift key, whereby when the latter is depressed said support will be moved so as to carry said master wheel into a position in which it may rotate without action on the wheels of said register, substantially as described.

9. The combination with a typewriter having a movable paper carriage, of a register case rigidly secured to said paper carriage, register wheels and carrying devices within said case, key controlled means for moving said register wheels, and means whereby said register wheels and carrying devices may rotate bodily, within said case, and said register wheels thereby be set to zero positions, substantially as described.

10. The combination with a typewriter having a movable paper carriage, of a register comprising a case rigidly secured to said paper carriage, a rotary support within said case, having a projecting hand piece, register wheels and carrying devices mounted on said set rotary support, key-controlled means for moving said register wheels, and means whereby said register wheels may be set to zero positions, by rotation of said support and parts carried thereby, within said case, substantially as described.

In testimony whereof I affix my signature in presence of two witnesses.

OSCAR C. KAVLE.

Witnesses:
E. G. LATTA,
CHESTER W. REID.